United States Patent [19]
Holmberg et al.
[11] Patent Number: 4,839,287
[45] Date of Patent: Jun. 13, 1989

[54] PROCESS FOR THE TRANSESTERIFICATION OF TRIGLYCERIDES IN AN AQUEOUS MICROEMULSION REACTION MEDIUM IN THE PRESENCE OF LIPASE ENZYME

[75] Inventors: Krister Holmberg, Molndal; Eva Osterberg, Goteborg, both of Sweden

[73] Assignee: Berol Kemi AB, Stenungsund, Sweden

[21] Appl. No.: 24,282

[22] Filed: Mar. 10, 1987

[51] Int. Cl.[4] .................... C12D 7/62
[52] U.S. Cl. .................... 435/135; 435/134; 435/72; 435/74
[58] Field of Search .................... 435/134, 135, 72, 74, 435/822, 921, 931, 141, 280

[56] References Cited

U.S. PATENT DOCUMENTS 4,275,011 6/1981 Tanaka et al. .................... 435/134
4,614,718 9/1986 Seino et al. .................... 435/72
4,668,628 5/1987 Dahod et al. .................... 435/136

*Primary Examiner*—Barry S. Richman
*Assistant Examiner*—T. J. Wallen

[57] ABSTRACT

A process is provided for the rapid transesterification of triglycerides with fatty acids in the presence of lipase enzyme, using an aqueous microemulsion reaction medium comprising a hydrophobic component, a surface-active component, and water.

14 Claims, No Drawings

PROCESS FOR THE TRANSESTERIFICATION OF TRIGLYCERIDES IN AN AQUEOUS MICROEMULSION REACTION MEDIUM IN THE PRESENCE OF LIPASE ENZYME

BACKGROUND OF THE INVENTION

Lipase enzymes are known to catalyze hydrolysis of triglycerides and other fats in accordance with the following reaction:

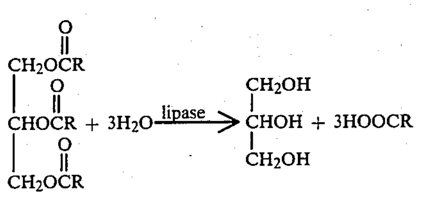

The lipase enzyme hydrolysis reaction requires water as a reactant, as indicated above. Lipase enzyme is a hydrophilic protein, and water is its natural environment, so that lipase enzyme-catalyzed reactions normally are carried out in an aqueous medium.

Recently, it has been found that some enzymes, among them lipases, also hydrolyze fats in organic solvent media. Water-miscible solvents, such as ethanol and acetone, cannot be used because of their denaturating effect on the enzymes. For example, aqueous alcohol solutions are used for wound treatment, because of their denaturating effect. However, hydrocarbons such as hexane and petroleum ether are effective in lipase-catalyzed hydrolysis, because the enzymes are stable in such solvents, but water as a reactant must be present, although the amount of water can be quite small. If the solvent system is anhydrous, i.e., if no water is present, the lipase catalyzes ester formation, i.e., the reverse reaction between fatty acid and glycerol to form a triglyceride, but not the hydrolysis of the triglyceride to form fatty acid and glycerol. Thus, it is possible simply by controlling the amount of water present to carry out either hydrolysis or condensation, using lipase enzymes. The water need not even be present in a water phase, or distributed in the organic solvent, but can also be hydrated or absorbed on a sorbent such as Celite or calcium carbonate, which is then dispersed in the organic solvent.

The fact that enzymes can function in what is essentially an anhydrous environment containing little or no water has expanded the range of utilization of enzyme-catalyzed reactions in organic synthesis. Both hydrolyses and condensations can be carried out, and solubility problems with organic substrates in water can be avoided, since organic solvents can be substituted for the water.

The use of lipases in condensation reactions of fatty acids with glycerol is of no practical interest, Because the triglycerides are available as raw materials in any desired quantities, and are inexpensive. However, transesterification of naturally-occurring triglycerides, or triglycerides prepared from naturally-occurring fats and oils, is of interest, because this enables the substitution of any desired combination of fatty acid groups in selected positions on the triglyceride. It is accordingly possible, starting from inexpensive naturally-occurring or prepared triglycerides, to prepare by transesterification triglycerides substituted with fatty acid groups in combinations that do not exist or are rarely found in nature. Since many lipase enzymes are selective in the positions which they attack in transesterification reactions on the triglyceride molecule, it is possible to incorporate the desired fatty acid groups in any selected position on the triglyceride molecule, i.e. positions 1, 2, or 3, or a random distribution of all three.

K. Yokozeki et al, *Europ J. Appl Microbiol Biotechnol* 14 1 (1982); T. Tanaka et al, *Agric Biol Chem,* 45 2387 (1981); and M. H. Coleman and A. R. Macrae, U.S. Pat. No. 4,275,081, patented June 30, 1981, describe the transesterification of triglycerides using position-specific lipases such as *Rhizopus delemar* to convert inexpensive triglyceride distillation fractions derived from palm oil and olive oil to a fatty acid composition and distribution which corresponds to that of cocoa butter. Natural cocoa butter is in very short supply, and quite expensive.

The chemical reaction in this transesterification can be illustrated as follows:

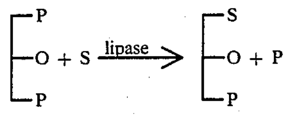

in which S is stearic acid, P is palmitic acid, and O is oleic acid. A mixture of stearic acid and a triglyceride with palmitic acid residues in positions 1 and 3 and an oleic acid residue in position 2 has been converted into a mixture of palmitic acid and a new triglyceride where the stearic acid residue now is in positions 1 and 3. The 1,3-specific lipase enzyme catalyzes a transesterification reaction in positions 1 and 3, and leaves position 2 intact.

Of course, other reactions take place as well, because palm oil or olive oil is not a pure P—O—P triglyceride, and cocoa butter is not a pure S—O—P triglyceride, but the above reaction does constitute a meaningful representation of what primarily takes place.

The process as described in the literature quoted above is preferably carried out in hexane or other aliphatic hydrocarbon. However, the reaction rate is slow, and reaction times of the order of 40 to 50 hours are required, to bring the transesterification to completion. The reaction temperature is effectively limited to 40° C., because of enzyme instability at higher temperatures, and so it is not possible to overcome the slow reaction rate by increasing the reaction temperature. Thus, the process has not been commercialized, because such long reaction times make the process uneconomic.

SUMMARY OF THE INVENTION

In accordance with the present invention, these difficulties are overcome by carrying out the reaction in a microemulsion comprising a hydrophobic component, a surface-active component, and water. In such a reaction medium, lipase enzyme rapidly transesterifies triglycerides, and by selection of the enzyme and the fatty acid that is transesterified with the triglyceride, it is possible to obtain any combination of fatty acid groups in the triglyceride, and these groups will be located according to the position-specificity of the lipase enzyme.

DETAILED DESCRIPTION OF THE INVENTION

Under normal reaction conditions, normal reaction temperatures within the range from about 25° to about 40° C., it is possible to reduce the reaction time to one-tenth of the time required in hexane or other aliphatic hydrocarbons, under the same reaction conditions.

The amount of water is not critical, but there is no reason to use large amounts of water. The maximum amount of water is that which would be tolerated in the microemulsion without making the microemulsion unstable, i.e. susceptible to phase separation.

Normally, the water content in the microemulsion should not exceed about 4% by weight, and preferably the amount is within the range from about 0.3 to about 2% by weight, still more preferably within the range from about 0.1 to about 2% by weight. At amounts of water in excess of about 4%, under some conditions, with certain enzymes, hydrolysis of the triglyceride may set in as a competing reaction, and the amount of triglyceride yield may be reduced.

The amount of lipase enzyme in the microemulsion is not critical, either, but a small amount is usually adequate to catalyze the reaction at a rapid rate. A suitable amount is within the range from about 0.1 to about 10 mg per 100 g of triglyceride, i.e., from about 0.1 to about 10% by weight of the triglyceride.

Any lipase enzyme capable of catalyzing the transesterification reaction can be used. These lipase enzymes are known, and are described in the literature. Exemplary are: *Aspergillus niger, Pseudomonas fluorescens, Numicola languinosa, Chromobacterium viscosum* and the various Rhizopus and Mucor species, such as *Rhizopus delemar.*

A microemulsion is a thermodynamically stable solution of an organic solvent immiscible in water together with a surface-active component having a hydrophobic group and a surface-active group, and water. The surface-active component serves as a stabilizer for the microemulsion.

The organic solvent component of the emulsion that is immiscible in water is preferably a hydrocarbon that is inert under the reaction conditions. Aliphatic hydrocarbons, such as hexane, heptane, isooctane, isoheptane, nonane, decane, undecane, dodecane, tridecane and tetradecane, can be used. Also useful are cycloaliphatic hydrocarbons, such as cyclopentane, cyclohexane and cycloheptane, as well as mixed hydrocarbons obtained from natural sources, such as for example petroleum or coal tar, for example, paraffin hydrocarbon solvents and petroleum ether boiling in the 60° to 80° C. range.

The water may also contain a buffer to provide a pH which is acceptable for the enzyme. Such buffers are known and form no part of theinstant invention; sodium bicarbonate, sodium monohydrogen phosphate, and sodium dihydrogen phosphate are exemplary.

As surface-active components providing both a hydrophobic group and a surface-active group, there can be used anionic, cationic, amphoteric and nonionic surface-active agents.

Exemplary anionic surface-active agents are the alkyl sulfates, alkylaryl sufonates, alkyl sulfonates, aryl sulfonates, sulfated fatty oils and acids, sulfated polyoxyalkylene glycol ethers and amidoalkane sulfonates.

The alkyl sulfonates are defined by the structure $R—SO_3—M$ where R represents a long chain saturated or unsaturated aliphatic group having from eight to eighteen carbon atoms, such as the mixed sodium alkane sulfonates derived from petroleum, sodium decane sulfonate, sodium dodecane sulfonate and sodium octadecane sulfonate.

The alkyl sulfates are the sulfated long chain alkyl alcohols having the formula $R—O—SO_3—M$ such as sodium lauryl sulfate, sodium palmityl sulfate, sodium octadecyl sulfate, sodium decyl sulfate and sodium octyl sulfate.

The aryl sulfonates and alkyl aryl sulfonates contain an aromatic ring having sulfonate groups attached to one or more of the ring carbon atoms. The alkyl aryl sulfonates have in addition an alkyl group having from one to sixteen carbon atoms. Both are defined by the chemical structure;

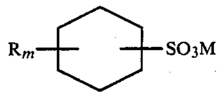

where R can be hydrogen or an alkyl group having from three to eighteen carbon atoms and m is the number of such groups and has a value from one to about four. Typical are sodium benzene sulfonate, sodium toluene sulfonate, sodium xylene sulfonate, sodium dodecyl benzene sulfonate, and sodium lauryl benzene sulfonate. One group of these compounds, the sodium polypropylene benzene sulfonates, is described in U.S. Pat. No. 2,477,383 to Lewis. Also useful are the sodium keryl benzene sulfonates.

The amidoalkane sulfonates are characterized by the structure of an amide, of which the nitrogen is attached through an alkylene group to the sulfonate radical, and have the structure:

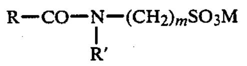

n is a small whole number from 1 to about 5, preferably 2 or 3, R' is hydrogen or an alkyl, aryl, or cycloaliphatic group, such as methyl, and R is an alkyl or alkylene radical, such as myristyl, palmityl, oleyl and stearyl. Sodium plamitic tauride, sodium plamitic methyl tauride, sodium myristic methyl tauride, sodium palmitic-stearic methyl tauride and sodium palmitic methyl amidopropane sulfonate are typical examples thereof. These are amphoteric.

The sulfonated acids and esters of organic acids also are useful, particularly the sulfuric acid esters of aliphatic acids of eight to twenty carbon atoms, particularly oleic acid, tall oil acids, turkey red oil acids, and acids derived by the reduction of the fatty acids derived from coconut oil, palm oil, sperm oil and the like long-chain fatty acids, sulfonated castor oil, esters and ethers of isethionic acid (beta hydroxyethylene sulfuric acid) and the esters and ethers of the acid sulfate of isethionic acid, i.e., ethionic acid, such as for example lauroylcycloimidinium-1-ethoxy-ethionic acid 2-ethionic acid, long-chain fatty acid esters and long-chain alkyl ethers of 2,3-dihydroxypropane sulfonic acid, and sulfuric acid esters of monoglycerides and glycerol monoethers.

The sulfated polyoxyalkylene glycol ethers have the structure $R—A—(YO)_x—Y—O—SO_3M$. These compounds are in every respect the same as the polyoxyalkylene glycol ethers described below, with the addition of the sulfate group O—$SO_3$—M.

In all of the above formulae, it will be understood that M represents hydrogen, or a monovalent inorganic cation such as sodium, potassium or ammonium, or a monovalent organic cation such as a highly basic amine, for example triethanolamine, diethanolamine, monoethanolamine or tributylamine.

Examples of suitable anionic compounds are di-(2-ethylhexyl) sulphosuccinate, and carboxy-methylated nonyl phenol ethyxylate containing 1-4 ethyleneoxy groups.

Also useful are the phosphate esters of the formula:

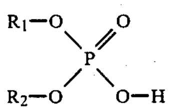

or alkali salts or ammonium salts thereof, in which $R_1$ and $R_2$ represent hydrogen or a group $R(OC_2H_4)_n$ where R represents a saturated or unsaturated, straight or branched alkyl or alkenyl radical having a total of 4–22, preferably 8–18, carbon atoms in the alkyl or alkenyl portion or a mono, di or trialkyl substituted phenol having a total of 6–24, preferably 8–18 carbon atoms in the alkyl portion, wherewith $R_1$ and $R_2$ do not at the same time comprise hydrogen, and n is 0–30, preferably 5–25.

The corresponding phosphonate esters of similar structure

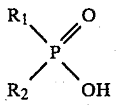

are also useful, as well as phospholipids, such as lecithin, which contain both phosphate and quaternary ammonium groups.

The nonionic surface active agents include polyoxyalkylene glycol ethers defined by the following general formula:

$$R—A—(Y—O)_x—Y—OH$$

wherein R is a straight or branched chain saturated or unsaturated hydrocarbon group having from about eight to about twenty-four carbon atoms, or an aralkyl group having a straight or branched chain saturated or unsaturated hydrocarbon group of from about eight to about twelve carbon atoms attached to the aryl nucleus, the aralkyl group being attached to A through the aryl nucleus. A is selected from the group consisting of ethereal oxygen and sulfur, amino, carboxylic ester and thio carboxylic ester groups. Y represents a straight or branched chain alkylene group having from two to four carbon atoms and x is a number from about 3 to about 20, preferably 3 to 8.

R can for example be a straight or branched chain alkyl group, such as octyl, nonyl, decyl, lauryl, myristyl, cetyl or stearyl; an alkylene group, such as hexenyl, dodecenyl, oleyl, linoleyl, ricinoleyl, or linolenyl; or an alkyl aryl group, such as octyl phenyl, nonyl phenyl, decyl phenyl, dodecyl phenyl, or isooctyl phenyl. Y can be ethylene, 1-methylethylene, 1,2-diethylethylene, 1,1-diethylmethylene, 1,3-propylene and 1-butylene.

When R is alkyl, it will be evident that the polyoxyalkylene glycol ether can be regarded as derived from an alcohol, mercaptan, amine, or an oxy or fatty acid of high molecular weight, by condensation with an alkylene oxide, for example, ethylene oxide, 1,2-propylene oxide, 2,3-butylene oxide or 1,2-butylene oxide. Typical of this type of product are the condensation products of oleyl, stearyl, lauryl, palmityl, and mydristic alcohol, mercaptan or amine or oleic, lauric, palmitic, myristic or stearic acid, with from 8 to 1 moles of ethylene oxide such as Emulfor-ON, Nonic 218, Sterox SE and Sterox SK. Typical alkyl esters are Renex (polyoxyethylene ester of tall oil acids) and Neutronyx 330, and 331, higher fatty acid of polyethylene glycol.

When R is aralkyl the polyoxyalkylene glycol ether can be derived from an alkyl phenol or thiophenol.

Examples of such compounds are ethylene oxide adducts of nonyl phenol, octyl phenol and fatty alcohols. Monoglycerides are another preferred group of nonionic surfactants.

The polyoxyalkylene alkyl phenols and thiophenols have the following general formula:

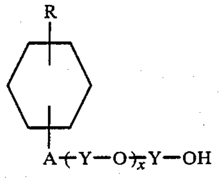

where R is a straight or branched chain saturated or unsaturated hydrocarbon group having from about eight to about eighteen carbon atoms, A is oxygen or sulfur, and x is a number from 8 to 20. R can, for example, be a straight or branched chain octyl, nonyl, decyl, lauryl, cetyl, myristyl or stearyl group. Typical are the condensation products of octyl and nonyl phenol and thiophenol with from 8 to 17 moles of ethylene oxide, available commercially under the tradenames "Igepal CA" and "CO", NIW, Antarox A 400, Triton X-100, Neutronyx 600 and Tergitol NFX.

Also useful are the mixed polyoxyethylene oxypropylene ethers having the formula:

$$Y_n(C_2H_4O)_x(C_3H_6O)_m(C_2H_4O)_{yp}H_n$$

These compounds are described in U.S. Pat. Nos. 2,674,619 to Lundsted, dated Apr. 6, 1954, and 2,677,700 to Jackson et al, dated May 6, 1954. They are condensates of a 1,2-alkylene oxide, such as 1,2-propylene oxide and 1,2-ethylene oxide, the ethylene oxide residues constituting from 20 to 90 percent of the resulting concentrate. Y as defined in these patents is the residue of an organic compound containing therein a single hydrogen atom capable of reacting with a 1,2-alkylene oxide, and the total of x and y is from 2 to 20. x and y may also be zero. n is a number from 1 to 25; p is a number from 1 to 5, and the average weight of the entire block polymer is from 1,000 to 4,000.

Organic compounds suitable for forming Y are compounds in which the hydrogen atoms are activated by an oxygen atom, such as in a hydroxyl group, a phenol group or a carboxyl group, or by a basic nitrogen atom, such as in an amine group and amide group, a sulfamide group, a carbamide group, and a thiocarbamide group, or by a sulfur atom, such as in a mercaptan.

Exemplary Y compounds are glycerol, ethylene glycol, propylene glycol, ethanol, ethanol, isopropanol, n-butanol, 2-ethylhexanol, lauryl alcohol, cetyl alcohol, stearyl alcohol, eicosanol, oleyl alcohol, so-called OXO-alcohol mixtures, butanediol, pentaerythritol, oxalic acid, triethanolamine, aniline, resorcinol, triisopropanolamine, sucrose, ethylenediamine, diethylenetriamine, acetamide, coconut oil fatty amine, methyl mercaptan, dodecyl mercaptan, hexadecyl mercaptan, etc.

Exemplary of this type of nonionic surfactants are propylene glycol condensed with 20 moles of propylene oxide and then with 5 moles of ethylene oxide, Y being hydroxyl, $n=1$, $x+y=5$, $m=21$, and $p=1$, as well as ethylene diamine with which have been condensed 12 moles of propylene oxide followed by 10 moles of ethylene oxide, Y being an ethylene diamine residue, $n=4$, $x=0$, $y=2.5$, $m=3$, and $p=4$.

Another type of polyoxyalkylene glycol ether surfactants has the formula:

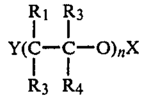

Y is an organic residue as defined above, and $R_1$, $R_2$, $R_3$ and $R_4$ are selected from the group consisting of hydrogen, aliphatic and aromatic radicals, at least one of these substituents not being hydrogen. n is a number greater than 6.4, as determed by hydroxyl number, and X is a water-solubilizing group, as defined in U.S. Pat. Nos. 2,674,691 and 2,677,700.

Exemplary of this type of compound are the fatty alcohol styrene oxide condensates containing 7 moles of styrene oxide, with the water-solubilizing group X being 70 moles of ethylene oxide.

Among nonionic surfactants, polyethylene glycol is the preferred hydrophilic component, and the average length of the polyethyleneglycol chain is between 3 and 8 ethylene oxide units. The hydrophobic part may be derived from hydroxyl compounds or carboxyl compounds containing an alkyl chain of 8 to 20 carbon atoms, or an alkylaryl group of 9 to 24 carbon atoms.

Useful cationic surface active components include quaternary ammonium lower alkyl and/or lower alkanol and/or polyoxyalkylene alkanol salts which have the formula:

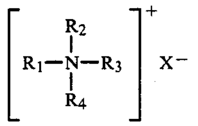

In the above formula, from one to four of $R_1$, $R_2$, $R_3$ and $R_4$ are saturated aliphatic hydrocarbon radicals having from one to about four carbon atoms; and/or from one to four of $R_1$, $R_2$, $R_3$ and $R_4$ are hydroxyalkyl or polyoxyalkylene radicals terminating in a hydroxyl group, and having a formula selected from the group consisting of $(C_2H_4O)_mH$, $(C_3H_6O)_pH$ and $(C_4H_8O)H$, wherein m is an integer from one to ten, p is an integer from one to five, and q is an integer from one to two; and mixtures of two or more thereof. Thus, all of the R radicals are either saturated lower aliphatic hydrocarbon radicals or hydroxyalkyl or hydroxyalkylene polyoxyalkylene radicals of these types.

X is an inorganic anion, and is preferably selected from the group consisting of $HSO_4$, $CH_3SO_4$, $C_2H_5SO_4$, Cl and Br.

Additional cationic wetting agents are the higher fatty acid esters of hydroxy amide quaternary salts, such as the lauric ester of N(β-hydroxyethyl-α-chloropyridinium)acetamide, the quaternary ammonium salt type, such as triamylbutylammonium cymene sulfonate, cetyl pyridinium bromide, oleyl pyridinium chloride, dimethyl phenyl benzyl ammonium salt of dibutyl-naphthalene sulfonic acid, trimethyl heptyl ammonium salt of sulfated butyl oleate, octadecyl trimethyl ammonium chloride, straight chain fatty amines of eight to eighteen carbon atoms, such as stearylamine, dilaurylamine, lauryl di(hydroxy ethyl)amine, the polyamines made from the reduction of polymerized unsaturated fatty nitriles, i.e., the polymerized nitrile of linseed oil fatty acids, and the quaternary compounds from alkyl halides and hexamethylene tetramine, the reaction products of α-halogenated fatty acid anilides or esters such as α-chloro-stearic anilide or α-bromo-stearic ethyl ester with tertiary amines such as trimethylamine, reaction products of long chain alkyl phenols with amines and aldehydes, such as the reaction product of p-t-octylphenol with formaldehyde and dimethylamine, which products may also be quaternized, such as

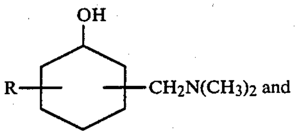
and
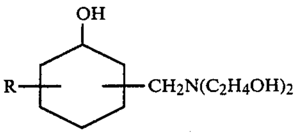

where R is an alkyl group of six to eighteen carbon atoms, the amidoalkylene amines $RCONHCH_2CH_2N-R_1R_2$ where R is an alkyl group of six to eighteen carbon atoms, and $R_1$ and $R_2$ are alkyl or hydroxyalkyl groups of one to five carbon atoms (the Sapamines), the amidoalkylene quaternary ammonium salts

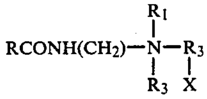

where R is as above, $R_1$, $R_2$ and $R_3$ are alkyl or aryl or alkaryl, and X is an anion such as halide, alkyl ether amines of the type $ROCH_2NR_1R_2$ and their quaternary ammonium salts $ROCH_2NR_1R_2R_3X$ where R, $R_1$, $R_2$, $R_3$ and X are as above, the corresponding thio ethers $RSCH_2NR_1R_2$ and $RSCH_2NR_1R_2R_3X$, the long-chain alkyl sulfonium compounds of the type

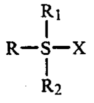

where R, $R_1$, $R_2$ and X are as above; such as cetyl methyl ethyl sulfonium bromide, and amido sulfonium salts of the type

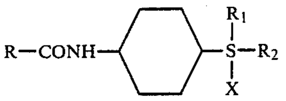

where R, $R_1$, $R_2$ and X are as above, and the Victamines

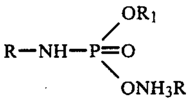

where R and $R_1$ are as above, such as that made from stearylamine and ethyl metaphosphate:

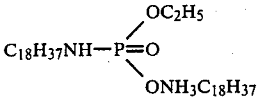

In addition to the surface-active component, the microemulsion can include an auxillary surfactant, which is usually a low molecular weight alcohol or glycol ether, and forms no part of the instant invention.

Examples of conventional substances of this type are butanol, pentanol, hexanol, butyl glycol and butyl diglycol.

It has proved especially advantageous to use a surface-active component capable of forming microemulsions without an auxiliary surfactant. Exemplary of such surface-active components are the polyoxyalkylene glycol esters described above, as well as anionic compounds having the anionic hydrophilic group in a nonterminal position on a hydrocarbon chain.

In general, the microemulsion suitable as a reaction medium for the process of the invention contains:

(1) an amount within the range from about 81 to about 99.8%, preferably from about 93 to about 99%, by weight of the hydrophobic component;

(2) an amount within the range from about 0.1 to about 15%, preferably from about 0.3 to about 8%, by weight of the surface-active component; and (3) an amount within the range from about 0.1 to about 4%, preferably from about 0.3 to about 2%, by weight of water.

The process of the invention is applicable to any triglyceride, but particularly to the triglycerides in naturally-occurring fats and oils, either in the form of the naturally occurring fat or oil, or in a fraction or derivative thereof, such as a distillation product or hydrogenation product thereof. Exemplary fats and oils to which the process can be applied include lard, tallow, palm oil, coconut oil, cottonseed oil, safflower seed oil, tung oil, sunflower seed oil, fish oil, rapeseed oil, whale oil, sperm oil, oiticica oil, palm kernel oil, olive oil, corn oil, and soybean oil.

The transesterification can be effected with any fatty acid, but is normally with a fatty acid derived from a naturally-occurring fat or oil. The fatty acid can be any aliphatic saturated or unsaturated fatty acid having from about six to about twenty four carbon atoms, including capric acid, caprylic acid, caproic acid, lauric acid, myristic acid, palmitic acid, stearic acid, oleic acid, linoleic acid, linolenic acid, ricinoleic acid, erucic acid, and behenic acid. Mixtures of acids can be used.

The following Examples represent preferred embodiments of the process of the invention:

Example 1

An enzymatic transesterification of palm oil triglyceride with stearic acid was carried out in a microemulsion having the following composition, in % by weight:

| | |
|---|---|
| 2.7% | Triethylene glycol ether of dodecyl alcohol |
| 96.2% | Technical nonane |
| 1.1% | Water in the form of sodium hydrogen phosphate buffer (pH 8) |

The amount of palm oil/stearic acid (weight ratio 2:1) was 5.3 grams per 100 grams microemulsion. The enzyme was *Rhizopus delemar,* in an amount of 34 mg per 100 g of microemulsion.

The reaction was carried out at 35° C., with stirring. The microemulsion was mixed with the *Rhizopus delemar,* and then heating begun to bring the temperature to 35° C. The reaction was continued for 48 hours at 35° C., with samples being taken after 4, 8, 24 and 48 hours. The triglyceride was analyzed chromatographically in respect to the fatty acid composition.

The reaction, as shown in Table I below, progressively replaces with stearic acid the palmitic acid and the oleic acid in the palm oil. The transesterification reaction has effectively reached completion after about four hours, since there is very little change in composition thereafter.

TABLE I

| Reaction time (hours) | Fatty acid composition of the triglyceride (%) Stearic acid | Palmitic acid | Oleic acid |
|---|---|---|---|
| 0 | 5.4 | 48.7 | 45.9 |
| 4 | 27.8 | 32.1 | 40.1 |
| 8 | 27.0 | 33.2 | 39.8 |
| 24 | 31.1 | 34.9 | 34.0 |
| 48 | 31.2 | 35.4 | 33.4 |

In comparison, the same transesterification was carried out in accordance with the prior art, transesterifying palm oil with stearic acid in hexane as a solvent. The composition of the reaction mixture was as follows, per 100 g microemulsion:

| | |
|---|---|
| 5 g | palm oil/stearic acid 2:1 |
| 0.3 g | Celite |
| 94.6 g | Technical nonane |
| 0.1 g | Water in the form of sodium hydrogen phosphate buffer (pH 7) |
| 34 mg | *Rhizopus delemar* |

The components were mixed, and the reaction mixture brought to 35° C. with stirring, and continued at 35° C. for 48 hours. Samples were taken after 4, 8, 24 and 48 hours. The triglyceride was subjected to chromatographic analysis, and the fatty acid composition determined, with the results shown in Table II below.

TABLE II

| Reaction time (hours) | Fatty acid composition of the triglyceride (%) Stearic acid | Palmitic acid | Oleic acid |
|---|---|---|---|
| 0 | 5.4 | 48.7 | 45.9 |
| 4 | 7.5 | 49.2 | 43.3 |
| 8 | 17.2 | 42.8 | 40.0 |
| 24 | 22.4 | 40.7 | 36.9 |

TABLE II-continued

| Reaction time (hours) | Fatty acid composition of the triglyceride (%) Stearic acid | Palmitic acid | Oleic acid |
|---|---|---|---|
| 48 | 32.6 | 31.2 | 36.2 |

It is apparent from the results in Table II that a reaction time of about 40 hours is required to bring the reaction to completion, about 10 times longer than in the process according to the invention.

Having regard to the foregoing disclosure the following is claimed as the inventive and patentable embodiments thereof:

1. A process for the rapid transesterification of triglycerides with fatty acids in the presence of lipase enzyme, which comprises tranesterifying a triglyceride with a fatty acid in the presence of lipase enzyme and in an aqueous microemulsion reaction medium comprising a water-immiscible hydrophobic component, a surface-active component, and water.

2. A process according to claim 1 in which the hydrophobic component is a water-immiscible hydrocarbon.

3. A process according to claim 2 in which the hydrocarbon is an aliphatic hydrocarbon.

4. A process according to claim 2 in which the hydrocarbon is a cycloaliphatic hydrocarbon.

5. A process according to claim 1 in which the surface-active component is an anionic surface-active agent.

6. A process according to claim 1 in which the surface-active component is a nonionic surface active agent.

7. A process according to claim 6 in which the nonionic surface-active agent is a polyoxyalkylene glycol ether.

8. A process according to claim 1 in which the microemulsion also comprises an auxiliary surfactant.

9. A process according to claim 1 in which the triglyceride is derived from a naturally-occurring fatty oil.

10. A process according to claim 9 in which the fatty oil is palm oil.

11. A process according to claim 1 in which the fatty acid is an aliphatic fatty acid having from six to twenty-four carbon atoms.

12. A process according to claim 1 in which the microemulsion comprises:

(1) an amount within the range from about 81 to about 99.8%, by weight of the hydrophobic component;

(2) an amount within the range from about 0.1 to about 15%, by weight of the surface-active component; and (3) an amount within the range from about 0.1 to about 4%, by weight of water.

13. A process according to claim 1 in which the lipase is *Rhizopus delemar*.

14. A process according to claim 1 in which the transesterification temperature is within the range from about 25° to about 40° C.

* * * * *